United States Patent
Paulin

(10) Patent No.: US 12,370,391 B2
(45) Date of Patent: Jul. 29, 2025

(54) DISTRIBUTION POLE AND METHOD OF FIREPROOF DISTRIBUTION POLE INSTALLATION

(71) Applicant: Valmont Industries, Inc., Omaha, NE (US)

(72) Inventor: Robert Paulin, Irmo, SC (US)

(73) Assignee: Valmont Industries, Inc., Omaha, NE (US)

(*) Notice: Subject to any disclaimer, the term of this patent is extended or adjusted under 35 U.S.C. 154(b) by 883 days.

(21) Appl. No.: 17/485,895

(22) Filed: Sep. 27, 2021

(65) Prior Publication Data

US 2022/0111237 A1    Apr. 14, 2022

Related U.S. Application Data

(60) Provisional application No. 63/089,560, filed on Oct. 9, 2020.

(51) Int. Cl.
  *E04H 12/00* (2006.01)
  *A62C 3/16* (2006.01)

(52) U.S. Cl.
  CPC .......... *A62C 3/16* (2013.01); *B32B 2307/306* (2013.01); *B32B 2307/3065* (2013.01); *E04H 12/00* (2013.01)

(58) Field of Classification Search
  CPC ... B29L 2031/766; F16L 59/145; F16L 57/04; E04B 1/94; E04B 1/943; E04B 1/944; E04B 1/945; E04H 12/02; E04H 12/08; E04H 12/32
  See application file for complete search history.

(56) References Cited

U.S. PATENT DOCUMENTS

| 6,060,002 | A | 5/2000 | Ishikawa |
| 7,682,993 | B2 | 3/2010 | Derrigan et al. |
| 9,365,017 | B2 | 6/2016 | Kreysler et al. |
| 10,099,450 | B1* | 10/2018 | Miller ............... B32B 7/12 |
| 2001/0015045 | A1 | 8/2001 | Paroly |
| 2003/0219561 | A1* | 11/2003 | Maybee ............ E04H 12/02 264/236 |
| 2005/0148706 | A1* | 7/2005 | Ahmed ............. C09D 183/04 524/405 |
| 2008/0274319 | A1* | 11/2008 | Berksoy ............ E04H 12/02 428/36.91 |

(Continued)

FOREIGN PATENT DOCUMENTS

| PT | 104301 A | 7/2011 |
| WO | 0003100 A1 | 1/2000 |

(Continued)

OTHER PUBLICATIONS

Translation of WO2010071466 (Year: 2010).*

*Primary Examiner* — Jessica L Laux
(74) *Attorney, Agent, or Firm* — Milligan PC LLO

(57) ABSTRACT

The present invention provides an improved fire resistant distribution pole and a method of installing the fireproof distribution pole. According to a preferred embodiment, the present invention includes a hollow, tapered main body which includes an intumescent veil layer. According to a further preferred embodiment, the intumescent veil layer includes a single layer of 1-2 mm thick intumescent material which extends from substantially 1 foot below grade level to 12-18 feet above grade level.

20 Claims, 3 Drawing Sheets

(56) References Cited

U.S. PATENT DOCUMENTS

| | | |
|---|---|---|
| 2010/0086268 A1 | 4/2010 | Reyes |
| 2010/0266790 A1 | 10/2010 | Kusinski et al. |
| 2011/0056170 A1* | 3/2011 | Lowe ................. E04H 12/2292 |
| | | 52/741.3 |
| 2016/0177589 A1 | 6/2016 | Ceko |
| 2016/0272891 A1 | 9/2016 | Tong et al. |
| 2017/0240264 A1* | 8/2017 | Reddy .................... B32B 21/08 |
| 2018/0002536 A1 | 1/2018 | Kittle et al. |
| 2019/0039124 A1* | 2/2019 | Uchinaka ............. B22D 13/102 |
| 2019/0112925 A1 | 4/2019 | Jakobsen |
| 2019/0119938 A1 | 4/2019 | Sorenson et al. |
| 2019/0144625 A1 | 5/2019 | Acharya et al. |

FOREIGN PATENT DOCUMENTS

| | | | | |
|---|---|---|---|---|
| WO | 0105886 A1 | 1/2001 | | |
| WO | 2004081311 A3 | 4/2005 | | |
| WO | WO-2010071466 A1 * | 6/2010 | ............. | E04H 12/02 |
| WO | 2010091525 A1 | 8/2010 | | |
| WO | 2014041494 A1 | 3/2014 | | |
| WO | 2015047915 A1 | 4/2015 | | |

* cited by examiner

DISTRIBUTION POLE AND METHOD OF FIREPROOF DISTRIBUTION POLE INSTALLATION

RELATED APPLICATIONS

The present application claims priority to U.S. Provisional Application No. 63/089,560 filed Oct. 9, 2020.

BACKGROUND AND FIELD OF THE PRESENT INVENTION

The present invention relates generally to an improved fire resistant distribution pole. More specifically, the present invention relates to an improved fire resistant distribution pole and a method of installing the fireproof distribution pole.

BACKGROUND OF THE INVENTION

Electrical distribution poles are generally single, vertical posts enclosing a central cavity. These distribution poles (also referred to as utility poles) are commonly installed at set intervals to support overhead power lines and other public utilities such as electrical cable, fiber optic cable, and related equipment such as transformers and streetlights. In this capacity, distribution poles are inexpensive ways to keep electrical wires and cables from touching the ground, and out of the way of people and vehicles.

An important limitation in using distribution poles is their susceptibility to fire damage. High temperatures around a distribution pole can reduce the pole's strength and lifespan. Additionally, high temperatures can damage internal wires and cables. This can result in extensive time and expense to restore electrical power in fire impacted areas. Often, the damage to the distribution poles is the critical factor in protecting and restoring electrical power since the underground wiring and the suspended overhead lines are otherwise protected from ground fires.

To protect distribution poles from fire, the most common solution is addition of fire-resistant additives to each pole during manufacture. This solution, however, is expensive and is often ineffective against higher temperatures. Further, when the resin layer is subjected to higher heat levels, the fire-resistant compounds expand and further reduce the strength of the pole. Another alternative is to apply a fireproofing coating to the outside of a fully formed pole. However, to be effective, this solution requires several passes through a painting booth and then requires an additional aesthetic coating thus adding significant time and expense to the production cost of each distribution pole.

SUMMARY OF THE PRESENT INVENTION

To address the shortcomings presented in the prior art, the present invention provides an improved fire resistant distribution pole to maximize the advantages of distribution poles while reducing their susceptibility to heat and fire damage.

In accordance with preferred embodiments, the fire resistant distribution pole of the present invention preferably includes an intumescent veil applied along a pre-determined length of a given pole. According to a preferred embodiment, the intumescent layer may include a composition of high temperature mineral fibers, exfoliating graphite, organic binders. and alumina trihydrate (ATH) or the like.

In accordance with a further preferred embodiment, the present invention provides an improved fire resistant distribution pole and a method of installing the fireproof distribution pole. According to a preferred embodiment, the present invention includes a hollow, tapered main body which includes an intumescent veil layer. According to a further preferred embodiment, the intumescent veil layer includes a single layer of 1-2 mm thick intumescent material which extends from substantially 1 foot below grade level to 12-18 feet above grade level.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

Figure 1:
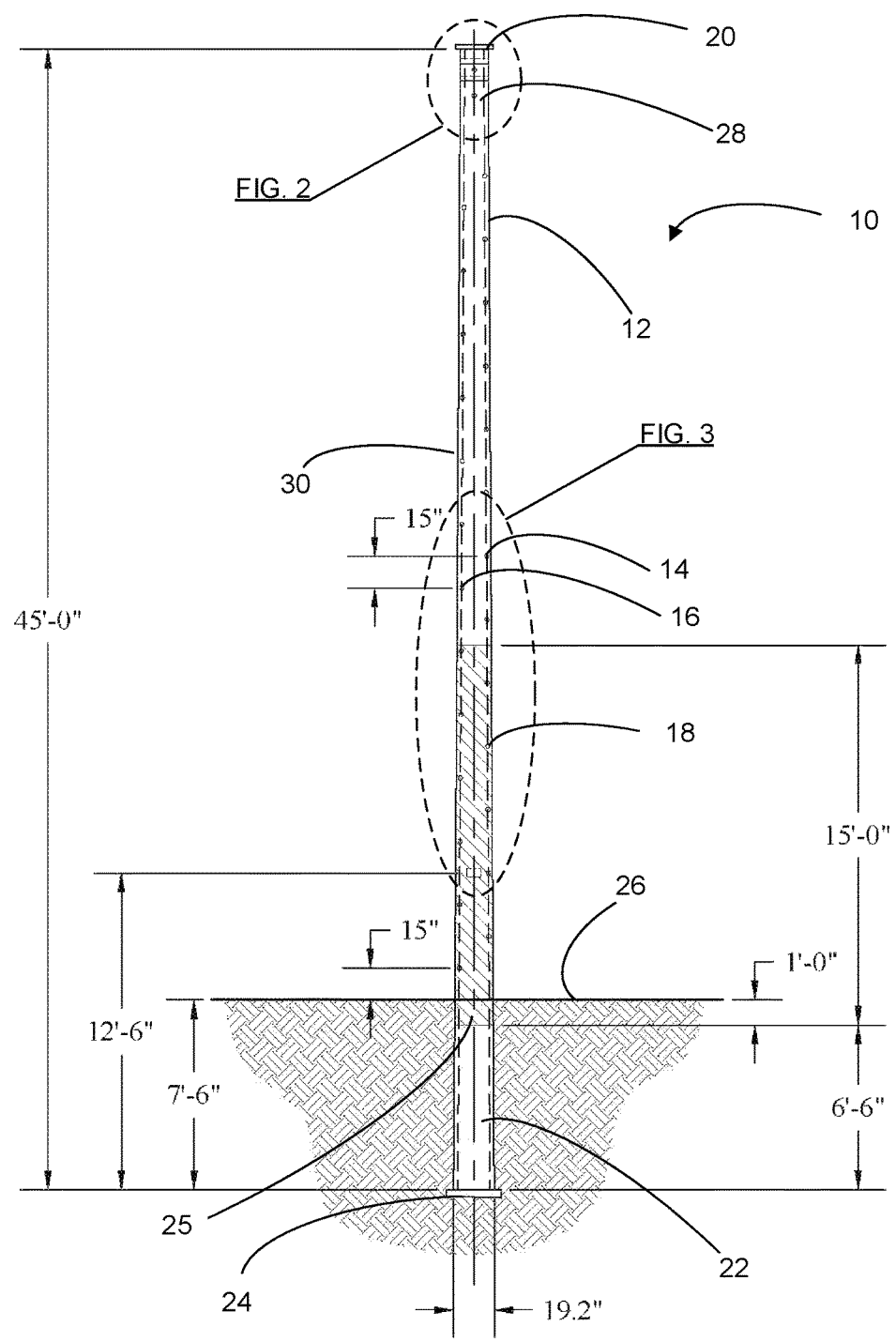
FIG. 1 is a schematic side view of an exemplary utility distribution pole installed in accordance with the present invention.

For the purposes of promoting an understanding of the principles of the present invention reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to on skilled in the art.

Reference is now made in detail to the exemplary embodiments of the invention, examples of which are illustrated in the accompanying drawings. Wherever possible, the same reference numbers will be used throughout the drawings to refer to the same or like parts. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 2:
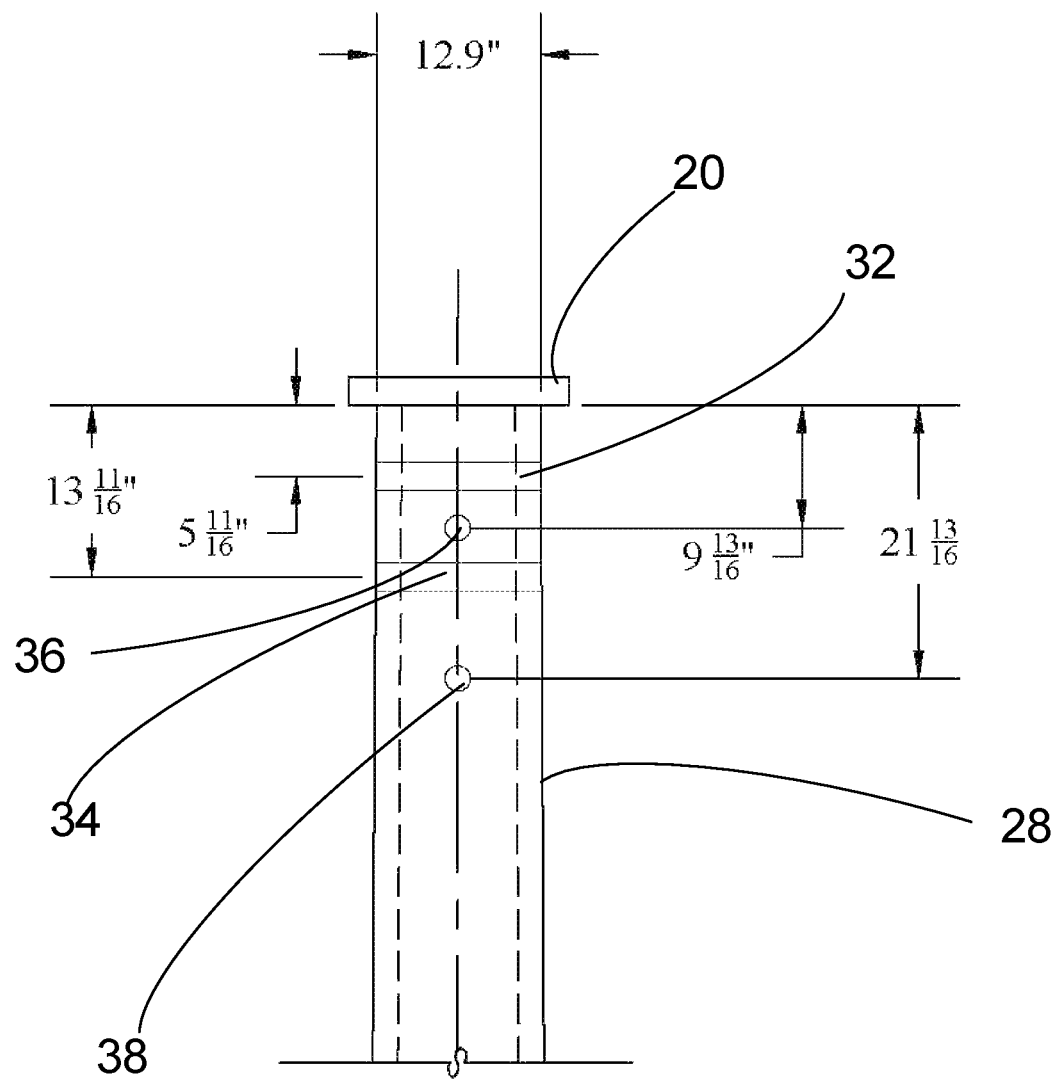
FIG. 2 is an enlarged view of the top portion of the exemplary distribution pole shown in FIG. 1.
Figure 3:
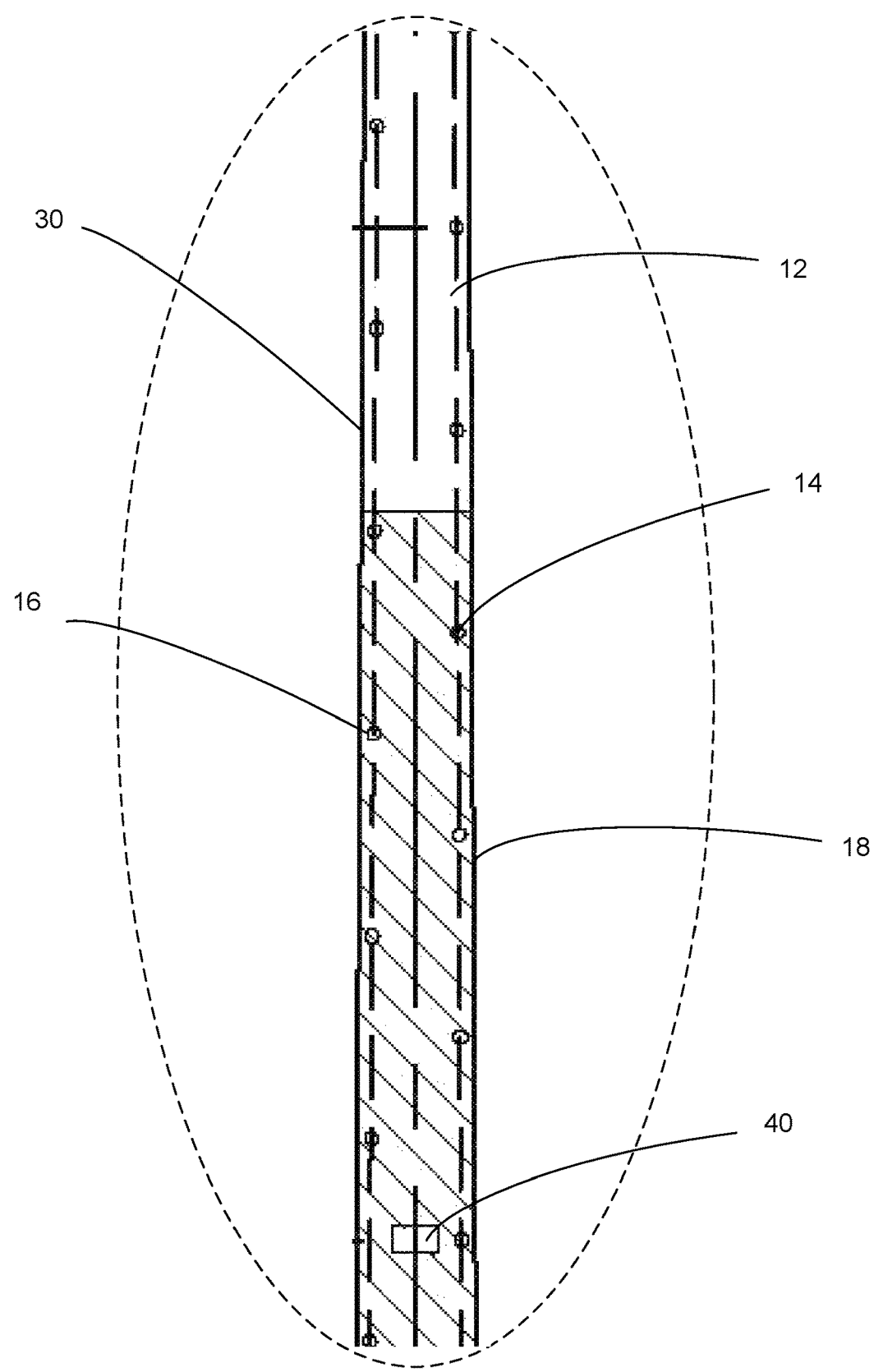
FIG. 3 is an enlarged view of a center portion of the exemplary distribution pole shown in FIG. 1.

With reference now to FIGS. 1-3, the present invention teaches a system, method and apparatus for forming an improved, fire-resistant distribution pole system 10. According to a preferred embodiment, the present invention includes a distribution pole 12 which includes an intumescent veil shielding layer 18 applied along a pre-determined length of the distribution pole 12.

With reference now to FIG. 1, a schematic side view of an exemplary distribution pole 12 in according with preferred embodiments of the present invention is provided. According to a preferred embodiment, the exemplary distribution pole 12 may include a hollow interior enclosed within a tapered, outer length of pole which extends from a wider base end 22 (i.e. larger circumference), through a tapered center portion 30, up to a narrower top pole section 28 (i.e. smaller circumference). As discussed below, the body of the exemplary pole 12 may be formed of any materials including composite materials or metals such as aluminum, steel or the like. According to a preferred embodiment, the exemplary pole 12 may be any length such as 20-50 feet in length. According to a preferred embodiment, the length of the pole 12 may be approximately 45 feet. The pole 12 may have a width at the base end cap 24 of approximately 19-20 inches (e.g. 19.2 inches) and may taper down to a width of 12-13 inches (e.g. 12.9 inches) at the top cap 20.

According to a preferred embodiment, the distribution pole 12 may, for example, be a centrifugally cast, composite pole formed from the systematic and repeated laying down of layers of resin and fiberglass. According to the present invention, any resin and fiberglass combination may be used. Further, the fiberglass may be in any of a variety of forms including single end or multi-end roving designs. According to a first preferred embodiment, the resin may be a resin such as DER 331 Epoxy Resin, Polyester F701 Resin or the like. According to a further preferred embodiment, the fiberglass used with the present invention may conform to any tex/yield specification which may be commercially available. For example, 450, 330, 250 or 112 YIELD GLASS or the like may be used without limitation. According to a first preferred embodiment, 330 YIELD GLASS may be used.

With reference again to FIG. 1, the lower portion 22 of the pole 12 may terminate with a composite plug 24 which may be inserted within the pole 12 or otherwise secured to outer surface of the pole 12. Preferably, the lower portion 22 of the pole 12 may preferably be installed so that the composite plug 24 is approximately 6-8 feet below grade level 26. According to a preferred embodiment, the composite plug 24 may preferably be approximately 7 feet, 6 inches below grade level 26.

As shown, the pole 12 may preferably further include a shielding veil layer 18 which may preferably extend from approximately 1 foot below grade level 26 to approximately 12-18 feet above grade level 26. Accordingly, the pole 12 may preferably include an underground shielding layer 25 which may be approximately 6 inches to 2 feet below grade level 26. According to a preferred embodiment, the underground shielding layer 25 may extend to approximately 1 foot below grade, and the above-ground portion of the shielding veil layer 18 may extend approximately fourteen feet above grade level 26.

According to further preferred embodiments, the veil shielding layer 18 (both below and above-grade) may include a single or multiple layers of centrifugally cast intumescent materials. According to a preferred embodiment, the veil shielding layer 18 may be formed of a single layer of 1-2 mm thick intumescent materials. The intumescent materials may include high temperature mineral fibers, exfoliating graphite, and organic binders. According to a further preferred embodiment, the veil materials may include active ingredients such as alumina trihydrate (ATH) to enhance performance. According to a further preferred embodiment, the materials may include a product which conforms to the specifications of an intumescent product such as TECNOFIRE® or the like. In use, the fire-proof veil preferably will expand away from the pole surface by up to 35 times its original thickness when it is exposed to fire or temperatures in excess of 190° C. (374° F.). The result of this expansion is a thick insulating char. Preferably, this stabilized char will significantly reduce the rate of degradation of underlying materials by insulating them from the heat energy and providing effective fire protection.

With reference now to FIGS. 1 and 2, details of the upper pole section 28 shall now be further discussed. As shown in FIG. 2, the upper pole section 28 may preferably include top composite cap 20 which may be approximately 12.9 inches wide. Preferably, the upper pole section 28 may include an upper supporting band 32 (approximately 5-6 inches from the top cap 20) and a lower supporting band 34 (approximately 13-14 inches from the top cap 20). The upper pole section 28 may also include a top, centered step hole 36 (approximately 9-10 inches from the top cap 20) and a second, centered step hole 38 (approximately 21-22 inches from the top cap 20).

With reference now to FIG. 3, an enlarged view of the center section 30 of the pole 12 is provided. As shown, the pole 12 may include groups of step holes 14, 16 which may extend along the length of the pole 12. As shown, these step holes 14, 16 may be approximately 1 inch step holes and may be plugged with metal plugs (not shown) when not used to support steps. As shown, the step holes may include a first set of vertically aligned holes 14 which may be spaced 5 inches to 5 feet apart. The step holes may also include at least a second set of vertically aligned holes 16. The first and second sets 14, 16 of step holes may be aligned so that pairs of step holes share the same height. Alternatively, each of the first and second sets 14, 16 of step holes may be vertically offset by a given increment. Additionally, the pole 12 may also include a tagging plate 40 or the like which may contain identifying information (e.g. date, model number etc.).

The present invention has been disclosed above with reference to several examples. These examples are not intended to be limiting. Instead, the scope of the present invention should be determined purely by the terms of the appended claims and their legal equivalents.

What is claimed is:

1. A distribution pole, wherein the distribution pole comprises:
   an upper portion; wherein the upper portion comprises a top end; wherein the top end comprises a first circumference; wherein the upper portion comprises a top cap;
   a central portion; wherein the central portion comprises a hollow interior enclosed within a tapered, outer surface;

a lower portion; wherein the lower portion comprises a base end; wherein the base end comprises a second circumference, wherein the second circumference is greater than the first circumference; wherein the base end comprises a base end cap; and an intumescent veil layer, wherein the intumescent veil layer comprises centrifugally cast intumescent materials; wherein the intumescent veil layer extends from below grade level to above grade level;

wherein the central portion is comprised of a metal layer; wherein the metal layer comprises material selected from the group of materials comprising: composite materials, aluminum and steel.

2. The distribution pole of claim 1;
wherein the distribution pole is 20-50 feet in length.

3. The distribution pole of claim 2, wherein the distribution pole is 45 feet in length.

4. The distribution pole of claim 2, wherein the base end cap is formed with a width in the range of 19-20 inches.

5. The distribution pole of claim 4, wherein the top cap comprises a width in the range of 12-13 inches.

6. The distribution pole of claim 1, wherein the distribution pole is a centrifugally cast, composite pole.

7. The distribution pole of claim 6, wherein the distribution pole comprises a plurality of layers of resin and fiberglass.

8. The distribution pole of claim 7, wherein the fiberglass is in the form of a single end or multi-end roving design.

9. The distribution pole of claim 8, wherein the resin comprises a resin selected from the group of resins comprising: DER 331 Epoxy Resin and Polyester F701.

10. The distribution pole of claim 9, wherein the fiberglass comprises fiberglass selected from the group of fiberglass comprising: 450, 330, 250 or 112 YIELD GLASS.

11. The distribution pole of claim 10, wherein the fiberglass comprises 330 YIELD GLASS.

12. The distribution pole of claim 7, wherein the base end cap comprises a composite plug inserted within the distribution pole.

13. The distribution pole of claim 12, wherein the lower portion is installed so that the composite plug is 6-8 feet below grade level.

14. The distribution pole of claim 13, wherein the lower portion is installed so that the composite plug is 7-8 feet below grade level.

15. The distribution pole of claim 12, wherein the intumescent veil layer extends below grade level to form an underground shielding layer.

16. The distribution pole of claim 15, wherein the intumescent veil layer extends 12-18 feet above grade level.

17. The distribution pole of claim 16, wherein the intumescent veil layer comprises a single or multiple layers of centrifugally cast intumescent materials.

18. The distribution pole of claim 17, wherein the intumescent veil layer comprises a single layer of 1-2 mm thick intumescent materials comprising mineral fibers, exfoliating graphite, and organic binders.

19. The distribution pole of claim 18, wherein the intumescent veil layer comprises alumina trihydrate (ATH).

20. A distribution pole, wherein the distribution pole comprises:

a hollow, tapered main body; wherein the main body comprises:

a base end, wherein the base end comprises a base end cap having a width in the range of 19-20 inches; wherein the base end cap is inserted 6-8 feet below grade level;

a tapered, center portion;

a top pole section, wherein the top pole section comprises a top cap having a width in the range of 12-13 inches; and an intumescent veil layer, wherein the intumescent veil layer extends from substantially 1 foot below grade level to 12-18 feet above grade level; wherein the intumescent veil layer comprises centrifugally cast intumescent materials;

wherein the intumescent veil layer comprises a single layer of 1-2 mm thick intumescent material; wherein the intumescent material comprises: high temperature mineral fibers, exfoliating graphite, organic binders and alumina trihydrate (ATH).

* * * * *